US008760360B2

(12) United States Patent
Kuo

(10) Patent No.: US 8,760,360 B2
(45) Date of Patent: Jun. 24, 2014

(54) SWITCHING MULTI-MODE ANTENNA

(75) Inventor: Jerry W. Kuo, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 118 days.

(21) Appl. No.: 13/421,870

(22) Filed: Mar. 16, 2012

(65) Prior Publication Data

US 2013/0241797 A1 Sep. 19, 2013

(51) Int. Cl.
*H01Q 3/24* (2006.01)
(52) U.S. Cl.
USPC .......................................... 343/876; 343/850
(58) Field of Classification Search
USPC ............ 343/876, 853; 455/553.1, 552.1, 101, 455/41.2, 183.2
See application file for complete search history.

(56) References Cited

U.S. PATENT DOCUMENTS

| | | | | |
|---|---|---|---|---|
| 6,990,357 B2 * | 1/2006 | Ella et al. | ................... | 455/553.1 |
| 7,251,499 B2 * | 7/2007 | Ella et al. | ................... | 455/552.1 |
| 7,383,032 B2 * | 6/2008 | Frank et al. | ................ | 455/183.2 |
| 7,511,681 B2 * | 3/2009 | Bolin | ........................... | 343/876 |
| 8,279,132 B2 * | 10/2012 | Jung et al. | ..................... | 343/853 |
| 8,543,059 B2 * | 9/2013 | Hsiao et al. | .................. | 455/41.2 |
| 2004/0162107 A1 | 8/2004 | Klemetti et al. | | |
| 2005/0245202 A1 | 11/2005 | Ranta et al. | | |
| 2006/0079275 A1 | 4/2006 | Ella et al. | | |
| 2006/0135210 A1 | 6/2006 | Frank | | |
| 2007/0142001 A1 * | 6/2007 | Sanders | ........................ | 455/101 |
| 2010/0225414 A1 * | 9/2010 | Gorbachov | .................... | 333/101 |
| 2011/0110452 A1 * | 5/2011 | Fukamachi et al. | .......... | 375/267 |
| 2013/0088404 A1 * | 4/2013 | Ramachandran et al. | .... | 343/853 |

FOREIGN PATENT DOCUMENTS

WO 2005039193 A2 4/2005

OTHER PUBLICATIONS

Pulse Electronics Corporation, (Aug. 23, 2011). "Pulse Electroncis Introduces Low Profile 700-LTE Switchable Antenna for Tablets," located at http://www.pulseelectronics.com/index.php?id=183&news_id=321, downloaded on Oct. 10, 2011, 2 pages.
International Search Report and Written Opinion for International Application No. PCT/US2013/031331, Sep. 17, 2013, 16 pages.

* cited by examiner

*Primary Examiner* — Hoang V Nguyen
(74) *Attorney, Agent, or Firm* — Lowenstein Sandler LLP

(57) ABSTRACT

Methods and apparatus of a switching multi-mode antenna of a user device are described. A switching multi-mode antenna is coupled to receive an RF input from one of at least two radio frequency (RF) feeds via a switch. The switching multi-mode antenna includes multiple antenna structures to communicate information in multiple frequency bands. A first antenna structure is configured to transmit first information in one of the frequency bands and a second antenna structure is configured to receive second information in the same one of the frequency bands.

33 Claims, 14 Drawing Sheets

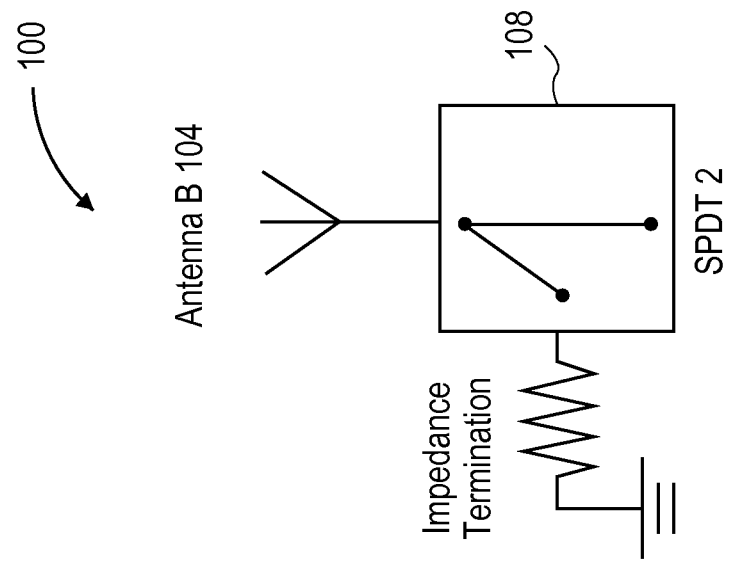
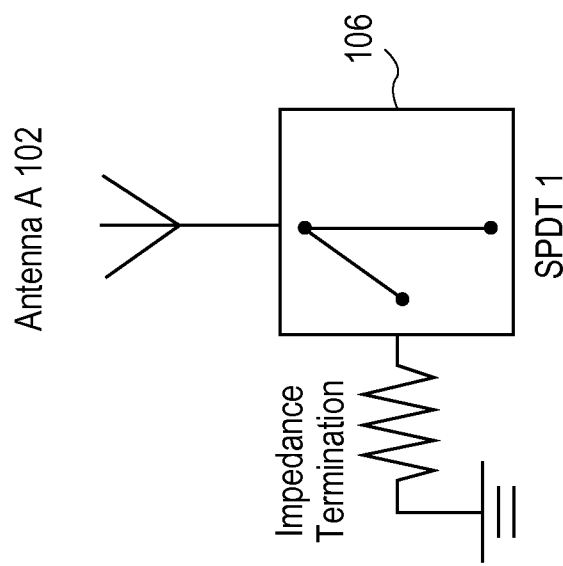
FIG. 1

SWITCHING MULTI-MODE ANTENNA

BACKGROUND OF THE INVENTION

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

The conventional antenna usually has only one resonant mode in the lower frequency band and one resonant mode in the high band. One resonant mode in the lower frequency band and one resonant mode in the high band may be sufficient to cover the required frequency band in some scenarios, such as in 3G applications. 3G, or 3rd generation mobile telecommunication, is a generation of standards for mobile phones and mobile telecommunication services fulfilling the International Mobile Telecommunications-2000 (IMT-2000) specifications by the International Telecommunication Union. Application services include wide-area wireless voice telephone, mobile Internet access, video calls and mobile TV, all in a mobile environment. The required frequency bands for 3G applications may be GSM850/EGSM in low band and DCS/PCS/WCDMA in high band. The 3G band is between 824 MHz and 960 MHz. Long Term Evolution (LTE) and LTE Advanced (sometimes generally referred to as 4G) are communication standards that have been standardized by the 3rd Generation Partnership Project (3GPP). However, in order to extend the frequency coverage down to 700 MHz for 4G/LTE application, antenna bandwidth needs to be increased especially in the low band. There are two common LTE bands used in the United States from 704 MHz-746 MHz (Band 17) and from 746 MHz-787 MHz (Band 13). Conventional solutions increase the antenna size or use active tuning elements to extend the bandwidth. These solutions are not conducive to use in user devices, often because of the size of the available space for antennas within the device.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 1 illustrates a circuit diagram of a switching multi-mode antenna having two antennas with two feeds and two single-pole, double-throw (SPDT) switches according to one embodiment.

DETAILED DESCRIPTION OF THE PRESENT INVENTION

Figure 2:
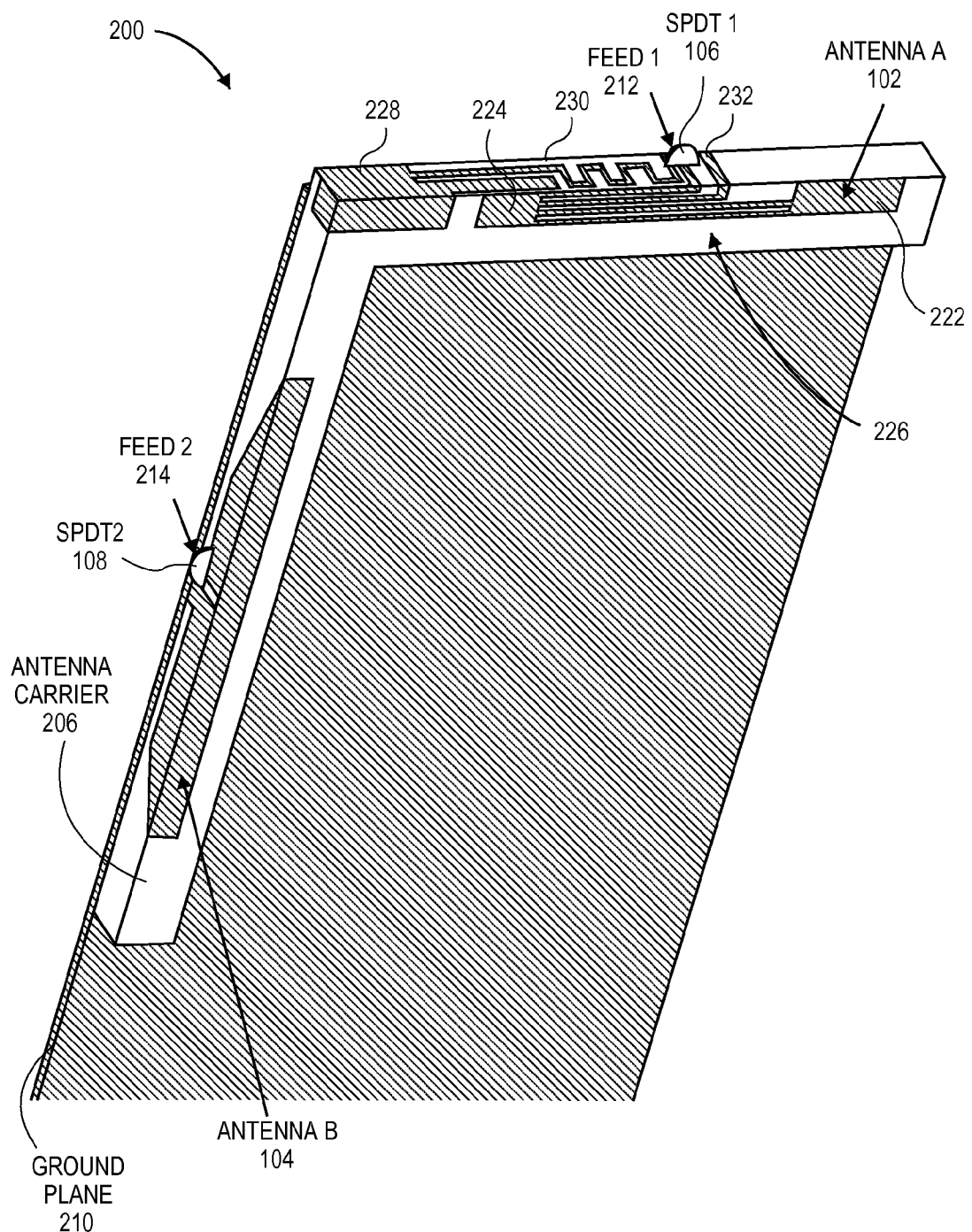
FIG. 2 illustrates a switching multi-mode antenna having two antennas disposed on antenna carrier and coupled to a ground plane of a user device according to one embodiment.

Methods and apparatus of a switching multi-mode antenna of a user device are described. A switching multi-mode antenna is coupled to receive an RF input from one of at least two radio frequency (RF) feeds via a switch. The switching multi-mode antenna includes multiple antenna structures to communicate information in multiple frequency bands. A first antenna structure is configured to transmit first information in one of the frequency bands and a second antenna structure is configured to receive second information in the same one of the frequency bands. The user device may be any content rendering device that includes a wireless modem for connecting the user device to a network. Examples of such user devices include electronic book readers, portable digital assistants, mobile phones, laptop computers, portable media players, tablet computers, cameras, video cameras, netbooks, notebooks, desktop computers, gaming consoles, DVD players, media centers, and the like. The user device may connect to a network to obtain content from a server computing system (e.g., an item providing system) or to perform other activities. The user device may connect to one or more different types of cellular networks.

As described above, the conventional antenna usually has only one resonant mode in the lower frequency band and one resonant mode in the high band. The embodiments described herein cover the desired bandwidth by using two antennas. The embodiments permit one of the frequency bands to be split between the two antennas. For example, the first antenna may be configured to cover an uplink operating band of a specified frequency band, and the second antenna may be configured to cover a downlink operating band of the specified frequency band. The antenna structure may include other elements to add additional resonant modes to modify, or even extend the frequency coverage of the switching multi-mode antenna. In one embodiment, the switching multi-mode antenna is configured to communicate in six operating bands, including operating bands 1, 2, 4, 5, 8, and 13. In one exemplary embodiment, the first antenna is configured to operate in the operating bands 5, 8, and 13 for both uplink and downlink (both TX and RX bands), and in the operating band 4 for just uplink (TX band only). The second antenna is configured to operate in the operating bands 1 and 2 for both uplink and downlink (both TX and RX bands), and in the operating band 4 for just downlink (RX band only). In another embodiment, the first antenna, operating in the three frequency bands, covers a range of frequencies between 824 MHz to 960 MHz and between 747 MHz to 787 MHz in a low band, and the first antenna, operating in the fourth frequency band, covers a first range of frequencies between 1710 MHz to 1755 MHz in a high band. The second antenna, operating in the fourth frequency band, covers a second range of frequencies between 2110 MHz to 2155 MHz in the high band. In a further embodiment, the second antenna, operating in the fifth frequency band, covers a range of frequencies between 1850 MHz to 1990 MHz in the high band, and the second antenna, operating in the sixth frequency band, covers a range of frequencies between 1920 MHz to 2170 MHz in the high band. In another embodiment, the range of frequencies may be between 1710 MHz to 2170 MHz in the high band. Alternatively, other frequency ranges may be achieved as would be appreciated by one of ordinary skill in the art having the benefit of this disclosure. The embodiments described herein of the switching multi-mode antenna can be used for LTE plus penta band user device. The embodiments described herein are not limited to use in LTE bands and the penta band, but could be used for other bands, such as Dual-band Wi-Fi, GPS and Bluetooth frequency bands. The embodiments described herein provide a switching multi-mode antenna to be coupled to a single RF input feed and does not use any active tuning to achieve the extended bandwidths. The embodiments described herein also provide a switching multi-mode antenna that has a small form factor that is conducive to being used in a user device. It should be noted that some of the operating bands described herein are set forth in Evolved Universal Terrestrial Radio Access (E-UTRA) of the 3GPP LTE specifications. Alternatively, other operating bands in other specifications may be used as would be appreciated by one of ordinary skill in the art having the benefit of this disclosure.

FIG. 1 illustrates a circuit diagram of a switching multi-mode antenna 200 having two antennas 102,104 with two feeds and two single-pole, double-throw (SPDT) switches 106,108 according to one embodiment. The antenna A 102 and the antenna B 104 are complementary to each other for bandwidth requirements, since, when the antenna A 102 is coupled to one of the two feeds, antenna B 104 is coupled to an impedance termination, such as 50-ohm load. Then when the antenna B 104 is coupled to the other one of the two feeds, antenna A 102 is coupled to the impedance termination. It should be noted that the impedance terminations, which are illustrated separately, could be the same impedance termination as would be appreciated by one of ordinary skill in the art having the benefit of this disclosure. In one embodiment, the switches 106, 108 are single pole, single throw (SPDT) switches. In one embodiment, the SPDT switch is a SPDT switch developed by SONY Corporation of Tokyo Japan, such as CXG1406SR which has 0.2~0.3 dB induction loss (I.L). It should also be noted that two SPDTs are equivalent to a double pole, double throw (DPDT) switch. Alternatively, switches with larger numbers of poles or throws can be used as would be appreciated by one of ordinary skill in the art having the benefit of this disclosure.

FIG. 2 illustrates a switching multi-mode antenna 200 having two antennas 102,140 disposed on antenna carrier 206 and coupled to a ground plane 210 of a user device according to one embodiment. In the depicted embodiment, the antenna carrier 206 is disposed on a front side of the ground plane 210. A first portion of the antenna carrier 206 is disposed on a side edge of the ground plane 210, and a second portion of the antenna carrier 206 is disposed towards a top edge of the ground plane 210. In one embodiment, the first portion is disposed to be flush between the edge of the ground plane 210 and the edge of the first portion on the one side. This configuration can be considered to have no clearance for antenna B 104. In another embodiment, the second portion is disposed to extend beyond the ground plane by a specified distance so that the top edge of the ground plane 210 is below a top edge of the second portion. This configuration can be considered to have a clearance for antenna A 102. In one embodiment, the clearance for antenna A may be 2 mm×58 mm×5 mm. Alternatively, other dimensions of the clearance may be used. Alternatively, the antenna carrier 206 can be disposed in other configurations as would be appreciated by one of ordinary skill in the art having the benefit of this disclosure.

In the depicted embodiment, the SPDT 2 switch 108 is coupled to switch between an RF feed 214 (also referred to as an RF input) and an impedance termination, and the SPDT 1 switch 106 is coupled to switch between an RF feed 212 and the impedance termination. The SPDT 1 switch 106 is coupled to drive the first antenna A 102 and the SPDT 2 switch 108 is coupled to drive the second antenna B 104. The first antenna A 102 is configured to communicate (transmit and receive) first data in a first set of frequency bands, and is configured to transmit second data in an additional frequency band when the first SPDT 1 switch 106 is coupled to the first RF feed 212. The second antenna B 104 is configured to communicate (transmit and receive) third data in a second set of frequency bands, and is configured to receive fourth data in the additional frequency band when the second SPDT switch 108 is coupled to the second RF feed 214. In effect, the first antenna A 102 and the second antenna B 104 split one of the frequency bands for transmitting and receiving data. In one embodiment, the first antenna A 102 operates in one or more frequency bands in a low band, and the second antenna B 104 operates in one or more frequency bands in a high band. In this embodiment, the first antenna A 102 also operates in one of the high band frequencies, but only to transmit data, where the second antenna B operates in the same high band frequency, but receives data.

For example, in one embodiment, a bandwidth of the switching multi-band antenna 200 is between 747 MHz and 2.26 GHz. In another embodiment, the first antenna A 102 is configured to communicate the first data in three frequency bands and to transmit the second data in a fourth frequency band (TX only). In this embodiment, the second antenna B 104 is configured to communicate the third data in fifth and sixth frequency bands and to receive the fourth data in the fourth frequency band (RX only). In one exemplary embodiment, the three frequency bands are operating band 5, operating band 8, operating band 13, and the fourth frequency band is operating band 4. As noted above, the first antenna A 102 is configured to communicate in a first frequency range of the operating band 4 and the second antenna B 104 is configured to communicate in a second frequency range of the operating band 4. In yet a further embodiment, the fifth frequency band is operating band 2, and the sixth frequency band is operating band 1. In another embodiment, the first antenna A 102, while operating in the three frequency bands, covers a range of frequencies between 824 MHz to 960 MHz and between 747 MHz to 787 MHz in a low band, and the first antenna A 102, while operating in the fourth frequency band, covers a first range of frequencies between 1710 MHz to 1755 MHz in a high band. The second antenna B 104, while operating in the fourth frequency band, covers a second range of frequencies between 2110 MHz to 2155 MHz in the high band. In yet a further embodiment, the second antenna B 104, while operating in the fifth frequency band, covers a range of frequencies between 1850 MHz to 1990 MHz in the high band, and the second antenna B 104, while operating in the sixth frequency band, covers a range of frequencies between 1920 MHz to 2170 MHz in the high band.

In another embodiment, the first antenna A 102 is configured to operate in uplink and downlink operating bands of the first set of frequency bands and in an uplink operating band of the additional frequency band, and the second antenna B 104 is configured to operate in a downlink operating band of the additional frequency band. In yet a further embodiment, the second antenna B 104 is configured to operate in uplink and downlink operating bands of the second set of frequency bands.

In the depicted embodiment, the first antenna A 102 includes a first portion 224 coupled to the first switch and coupled to the ground plane 210 via a ground line (not illustrated in FIG. 2 since it is coupled to the ground plane 210 on the back side of the antenna carrier 206). The first antenna A 102 also includes a second portion 222 coupled to the first portion 224 via one or more coupling lines 226. The first antenna A 102 also includes a parasitic ground element 228 coupled to the ground plane 210. The parasitic ground element 228 is coupled to the ground plane 210 via a meandering ground line 230. The parasitic ground element 228 may be configured to operate as a portion of a capacitor, and the meandering ground line 230 may be configured to operate as an inductor. In this embodiment, the first antenna A 102 is fed at the RF feed 212 at the first portion 224 and the ground element 228 is a parasitic element. A parasitic element is an element of the switching multi-mode antenna 200 that is not driven directly by the RF feed 212. Rather, the RF feed 212 directly drives another element of the switching multi-mode antenna (e.g., the first portion 224), which parasitically induces a current on the parasitic element (e.g., the parasitic ground element 228). In particular, by directly inducing current on the first portion by the RF feed 212, the directly-fed structure radiates electromagnetic energy, which causes another current on the parasitic ground element 228 to also radiate electromagnetic energy, creating multiple resonant modes. In the depicted embodiment, the parasitic ground element 228 is parasitic because it is physically separated from the first portion 224 that is driven at the RF feed 212. It can also be said that the parasitic ground element 228 is not conductively connected to the first portion 222. The first portion 222 parasitically excites the current flow of the parasitic ground element 228. In one embodiment, the parasitic ground element 228 and first portion 222 can be physically separated by a gap. Alternatively, other antenna configurations may be used to include a driven element and a parasitic element. The dimensions of the first portion 222 and the parasitic ground element 228 may be varied to achieve the desired frequency range as would be appreciated by one of ordinary skill in the art having the benefit of this disclosure, however, the total length of the antennas is a major factor for determining the frequency, and the width of the antennas is a factor for impedance matching. It should be noted that the factors of total length and width are dependent on one another.

In one embodiment, the first portion 224 provides a first resonant mode, the second portion provides a second resonant mode, and the parasitic ground element 228 provides a third resonant mode. The parasitic ground element 228 may also provide impedance matching to the first and second portions 224, 222. In one embodiment, the parasitic ground element 228 provides a first frequency band of the three frequency bands in a low band and increases a bandwidth of the switching multi-mode antenna 200. In another embodiment, the ground line 230 extends the bandwidth of the three frequency bands. In another embodiment, the coupling lines 226 increase coupling between the first portion 222, the second portion 224, and the parasitic ground element 228. In another embodiment, the parasitic ground element 228 includes an extension arm that folds back towards the RF feed 212 to form a first gap between the extension arm and the ground line 239 and a second gap between the extension arm and the first portion 222.

The antenna carrier 206 (also referred to as dielectric carrier) may be any non-conductive material, such as dielectric material, upon which the conductive material of the switching multi-mode antenna 200 can be disposed without making electrical contact with other metal of the user device. In another embodiment, portions of the switching multi-mode antenna 200 may be disposed on or within a circuit board, such as a printed circuit board (PCB). Alternatively, the switching multi-mode antenna 200 may be disposed on other components of the user device or within the user device as would be appreciated by one of ordinary skill in the art having the benefit of this disclosure. It should be noted that the switching multi-mode antenna 200 illustrated in FIG. 2 is a three-dimensional (3D) structure. However, as described herein, the switching multi-mode antenna 200 may include 2D structures, as well as other variations than those depicted in FIG. 2. In one embodiment, the first portion 222, the second portion 224, the parasitic ground element 228, or any combination thereof can be partially disposed on two or more sides of the first portion of the antenna carrier 206. For example, the parasitic ground element 228 can be disposed on a top surface, a front surface and one of the side surfaces of the first portion of the antenna carrier 206. Similarly, the first portion 224 may be disposed on the front side and a coupling line can extend from front side to the top side to couple to the feed 212. Also, a coupling line 232 can extend from the first portion 224 from the front side, wrapping around the top side onto the back side to couple to the ground plane 210. In the depicted embodiment, the coupling line 232 extends from an end of one of the coupling lines 226 that is coupled to the first portion 224. Alternatively, the first antenna A 102 can be disposed on the different combination of one or more surfaces of the antenna carrier 206. Also, the first antenna A 102 could be 2D and disposed in a single plane as would be appreciated by one of ordinary skill in the art having the benefit of this disclosure. However, by disposing the first antenna A 102 on multiple sides of the antenna carrier 206, the first antenna A 102 can have a smaller form factor, which may be beneficial for placement in user devices that do not have a lot of space within the user device. In another embodiment, the second antenna B 104 can be disposed on multiple sides of the second portion of the antenna carrier 206. In the depicted embodiment, the second antenna B 104 is disposed on a front surface and a side surface of the antenna carrier 206. As described above, the second antenna B 104 can be directly coupled to the ground plane 210 at the adjoining edges of the ground plane 210 and the antenna carrier 206. Similarly, the second antenna B 104 can be disposed in other configurations, in either 3D or in 2D as would be appreciated by one of ordinary skill in the art having the benefit of this disclosure.

In one embodiment, the antenna carrier 206 is a single part, such as illustrated in FIG. 2. In one embodiment, the antenna carrier 206 has a dielectric constant of ~2.9, such as some types of glass or plastic. In another embodiment, the antenna carrier 206 is two separate parts that are separated with a gap, such as illustrated in FIGS. 3-5 and 7-8. In one embodiment, the two separate parts are made up of the same material. In another embodiment, the second portion of the antenna carrier may be made up a different material, such as a second material that has a higher dielectric constant than that of a first material of the first portion. The second material may be ceramic, low temperature co-fired ceramic (LTCC), copper, or the like. For example, the second material may have a dielectric constant greater than 2.9, such as up to 15. It should be noted that a second material with a higher dielectric constant may be used to reduce the physical dimensions of the antenna structure.

In the depicted embodiment, the second antenna B 104 is disposed to a have a gap between the first and second antennas. In another embodiment, the second antenna B 104 could be disposed to have a larger gap or a smaller gap (shifted vertically along the second portion of the antenna carrier 206) since the first antenna A 102 is terminated (i.e., coupled to an impedance termination) when the second antenna B 104 is operating. Similarly, the first antenna A 102 can be disposed to have a larger gap or smaller gap (shifted horizontally along the first portion of the antenna carrier 206) since the second antenna B 104 is terminated (i.e., coupled to an impedance termination) when the first antenna A 102 is operating.

The ground plane 210 may be a metal frame of the user device. The ground plane 210 may be a system ground or one of multiple grounds of the user device. The RF feeds 212,214 may be a feed line connector that couples the switching multi-mode antenna 200 to a feed line (also referred to as the transmission line), which is a physical connection that carriers the RF signal to and/or from the switching multi-mode antenna 200. As described herein, the SPDT switches 106, 108 may be disposed somewhere along the feed line. The feed line connector may be any one of the three common types of feed lines, including coaxial feed lines, twin-lead lines, or waveguides. A waveguide, in particular, is a hollow metallic conductor with a circular or square cross-section, in which the RF signal travels along the inside of the hollow metallic conductor. Alternatively, other types of connectors can be used. In the depicted embodiment, one feed line connector is directly connected to a first terminal of the SPDT switch 106, and a second terminal is connected to the first antenna A 102. Another feed line connector is directly connected to a first terminal of the SPDT switch 108, and a second terminal is connected to the second antenna B 104. It should also be noted that the one feed line connector is not conductively connected to the parasitic ground element 228 of the first antenna A 102. However, the second portion 224 is configured to operate as a feeding structure to the parasitic ground element 228, and the parasitic ground element 228 and the ground line 230 (usually a meandered line) form a series LC resonances to provide an additional resonant mode. In this embodiment, the resonant mode is in the low band and can extend the bandwidth into the LTE frequency band, for example. The meandering ground line 230 contributes to impedance matching for the low band, and increases the bandwidth in the low band.

Using the first antenna A 102 and second antenna B 104, the switching multi-mode antenna 200 can create multiple resonant modes using the two RF feeds 212,214, such as three or more resonant modes. In one embodiment, the switching multi-mode antenna 200 has multiple resonant modes with a bandwidth between 747 MHz and 2.26 GHz. In one embodiment, the parasitic ground element 228 is configured to provide a first resonant mode in a frequency band between 747 MHz and 787 MHz, the second portion 222 is configured to provide a second resonant mode in a frequency band between 824 MHz to 960 MHz, and the first portion 224 is configured to provide a third resonant mode in a frequency band between 1710 MHz to 1755 MHz. The second antenna B 104 may not be a multi-mode antenna and may generate a single resonant mode in a frequency band between 1755 MHz and 2.26 GHz. Alternatively, other resonant modes and other frequency bands may be achieved by modifying the dimension of the antenna structure and the gaps between the antenna structures and the ground plane 210 as would be appreciated by one of ordinary skill in the art having the benefit of this disclosure. In another embodiment, the switching multi-mode antenna 200 can be configured to create a resonant mode for LTE 700 plus resonant modes for penta-band. In telecommunications, the terms multi-band, dual-band, tri-band, quad-band, and penta-band refer to a device, such as the user device described herein, supporting multiple RF bands used for communication. In other embodiments, the antennas can be designed to cover an eight-band LTE/GSM/UMTS, the GSM850/900/1800/1900/UMTS penta-band operation, or the LTE700/GSM850/900 (698-960 MHz) and GSM 1800/190/UMTS/LTE2300/2500 (1710-2690 MHz) operation. The embodiments described herein can be utilized in any application in the frequency range, like LTE (700/2700), UMTS, GSM (850, 900, 1800, and 1900), GPS, and WI-FI/Bluetooth. In another embodiment, the switching multi-mode antenna 200 can be designed to operate in the following target bands: 1) Verizon LTE band: 746 to 787 MHz; 2) US 850 (band 5): 824 to 894 MHz; 3) GSM900 (band 8): 880 to 960 MHz; 4) GSM 1800/DCS: 1.71 to 1.88 GHz; 5) US1900/PCS (band 2): 1.85 to 1.99 GHz; and 6) WCDMA band I (band 1): 1.92 to 2.17 GHz. Alternatively, the switching multi-mode antenna 200 can be configured to be tuned to other frequency bands as would be appreciated by one of ordinary skill in the art having the benefit of this disclosure.

In the user device context, the purpose of doing so is to support roaming between different regions whose infrastructure cannot support mobile services in the same frequency range. These frequency bands may be Universal Mobile Telecommunication Systems (UMTS) frequency bands, GSM frequency bands, or other frequency bands used in different communication technologies, such as, for example, cellular digital packet data (CDPD), general packet radio service (GPRS), enhanced data rates for GSM evolution (EDGE), 1 times radio transmission technology (1xRTT), evaluation data optimized (EVDO), high-speed downlink packet access (HSDPA), WiFi, WiMax, etc. In another embodiment, the switching multi-mode antenna 200 is configured to operate in operating bands 5, 8, 13, and 4, and the first antenna A 102 is configured to communicate in a first frequency range of the operating band 4 and the second antenna B 104 is configured to communicate in a second frequency range of the operating band 4. In yet a further embodiment, the second antenna B 104 is configured to operate in operating bands 2 and 1. It should also be noted that the first, second, third and fourth notations on the resonant modes are not be strictly interpreted to being assigned to a particular frequency, frequency range, or elements of the switching multi-mode antenna. Rather, the first, second, third, and fourth notations are used for ease of description. However, in some instances, the first, second, third and fourth are used to designate the order from lowest to highest frequencies. Alternatively, other orders may be achieved as would be appreciated by one of ordinary skill in the art having the benefit of this disclosure.

Figure 3:
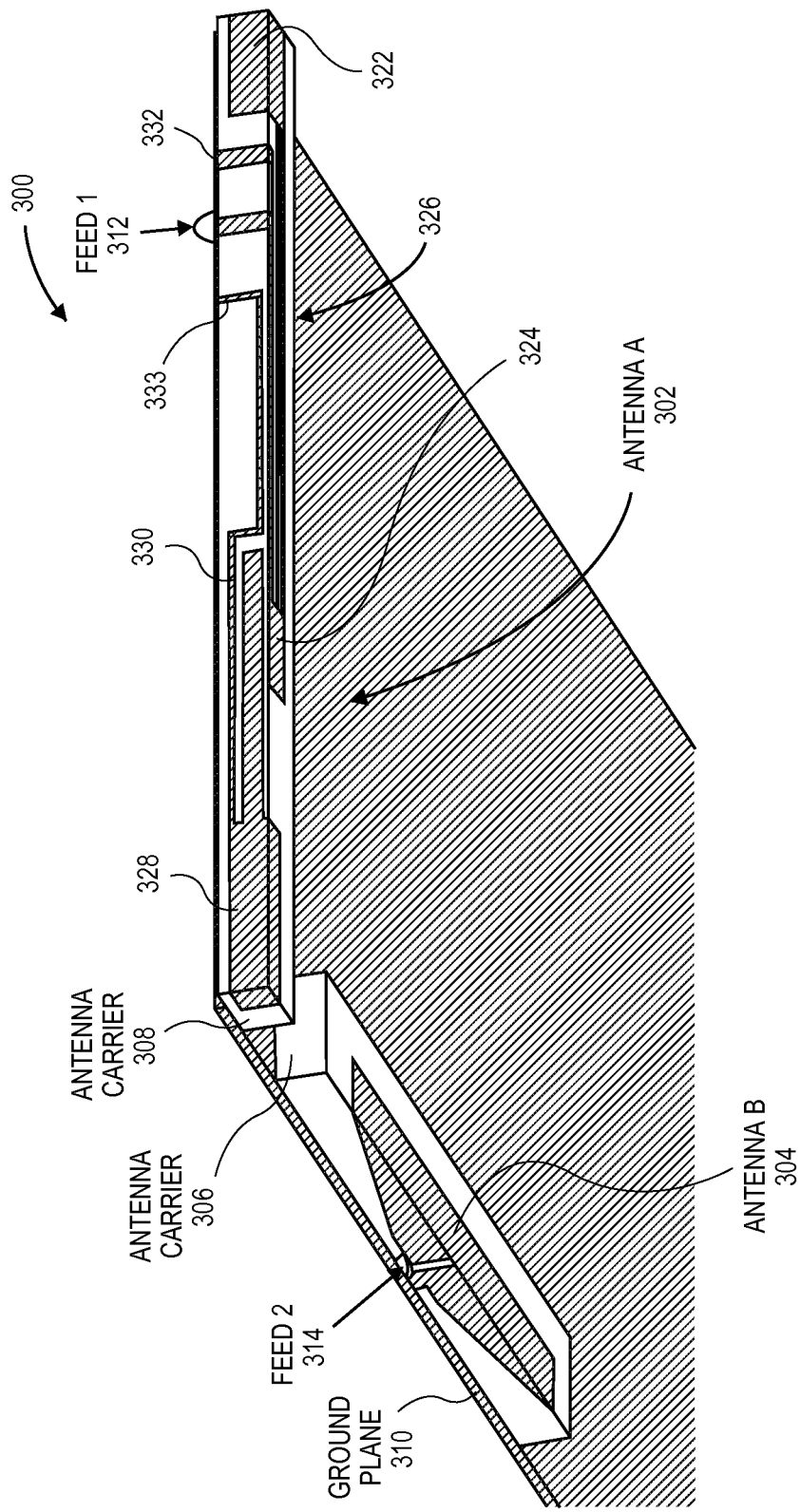
FIG. 3 illustrates a switching multi-mode antenna having two antennas disposed on antenna carrier and coupled to a ground plane of a user device according to another embodiment.

FIG. 3 illustrates a switching multi-mode antenna having two antennas disposed on antenna carrier and coupled to a ground plane of a user device according to another embodiment. In the depicted embodiment, the antenna carrier is two separate parts, antenna carriers 306 and 308. The antenna carriers 306, 308 are disposed on a front side of the ground plane 310. The antenna carrier 306 is disposed on a side edge of the ground plane 310, and the antenna carrier 308 is disposed towards a top edge of the ground plane 310. Like the antenna carrier 206 of FIG. 2, the antenna carriers 306 can be disposed with no clearance for antenna B 304, and the antenna carrier 308 is disposed to have a clearance for antenna A 302. In one embodiment, as depicted, the antenna carriers 306 and 308, and the corresponding antennas, are disposed orthogonally to one another. In another embodiment, the antenna carriers 306 and 308, and the corresponding antennas, may be disposed in other configurations, such as parallel to one another or at some other angle than 90 degrees.

In the depicted embodiment, a first SPDT switch is coupled to switch between an RF feed 312 (also referred to as an RF input) and an impedance termination, and a second SPDT switch is coupled to switch between an RF feed 314 and the impedance termination. The first SPDT switch is coupled to drive the first antenna A 302 and the second SPDT switch is coupled to drive the second antenna B 304. The first antenna A 302 is configured to communicate (transmit and receive) first data in a first set of frequency bands, and is configured to transmit second data in an additional frequency band when the first SPDT switch is coupled to the first RF feed 312. The second antenna B 104 is configured to communicate (transmit and receive) third data in a second set of frequency bands, and is configured to receive fourth data in the additional frequency band when the second SPDT switch is coupled to the second RF feed 314. In effect, the first antenna A 302 and the second antenna B 304 split one of the frequency bands for transmitting and receiving data. In one embodiment, the first antenna A 302 operates in one or more frequency bands in a low band, and the second antenna B 304 operates in one or more frequency bands in a high band. In this embodiment, the first antenna A 302 also operates in one of the high band frequencies, but only to transmit data, where the second antenna B 304 operates in the same high band frequency, but receives data.

Like the switching multi-mode antenna 200, the switching multi-mode antenna 300 may have a bandwidth of the switching multi-band antenna 200 is between 747 MHz and 2.26 GHz. Also, similar frequency bands and operating bands may be achieved with the switching multi-mode antenna 300 as described above with respect to FIG. 2. Similarly, the switching multi-mode antenna 300 may be configured to operate in similar uplink and downlink operating bands as described above with respect to FIG. 2.

In the depicted embodiment, the second antenna B 304 is similar to the second antenna B 104 of FIG. 1; however, the first antenna A 302 has different dimensions and shapes for portions of the antenna structure. For example, the meandering ground line 330 differs from the meandering ground line 230 of FIG. 2. Like the first antenna A 102, the first antenna A 302 includes a first portion 324 coupled to the first switch and coupled to the ground plane 310 via a ground line (illustrated in the back view of FIG. 5 but not illustrated in FIG. 3). The first antenna A 302 also includes a second portion 322 coupled to the first portion 324 via one or more coupling lines 326. The first antenna A 302 also includes a parasitic ground element 328 coupled to the ground plane 310. The parasitic ground element 328 is coupled to the ground plane 310 via the meandering ground line 330. The parasitic ground element 328 may be configured to operate as a portion of a capacitor, and the meandering ground line 330 may be configured to operate as an inductor.

Like described above with respect to the first antenna A 102, the antenna A 302 may be configured provide multiple resonant modes. In one embodiment, the first portion 324 provides a first resonant mode, the second portion 322 provides a second resonant mode, and the parasitic ground element 228 provides a third resonant mode. As described above, the parasitic ground element 328 may also provide impedance matching and possibly extend the bandwidth of the three frequency bands of the first antenna A 302. Similarly, the coupling lines 326 may be used to increase coupling between the first portion 322, the second portion 324, and the parasitic ground element 328. In another embodiment, the parasitic ground element 328 includes an extension arm that folds back towards the RF feed 312 to form a first gap between the extension arm and the ground line 330 and a second gap between the extension arm and the first portion 222.

Figure 4:
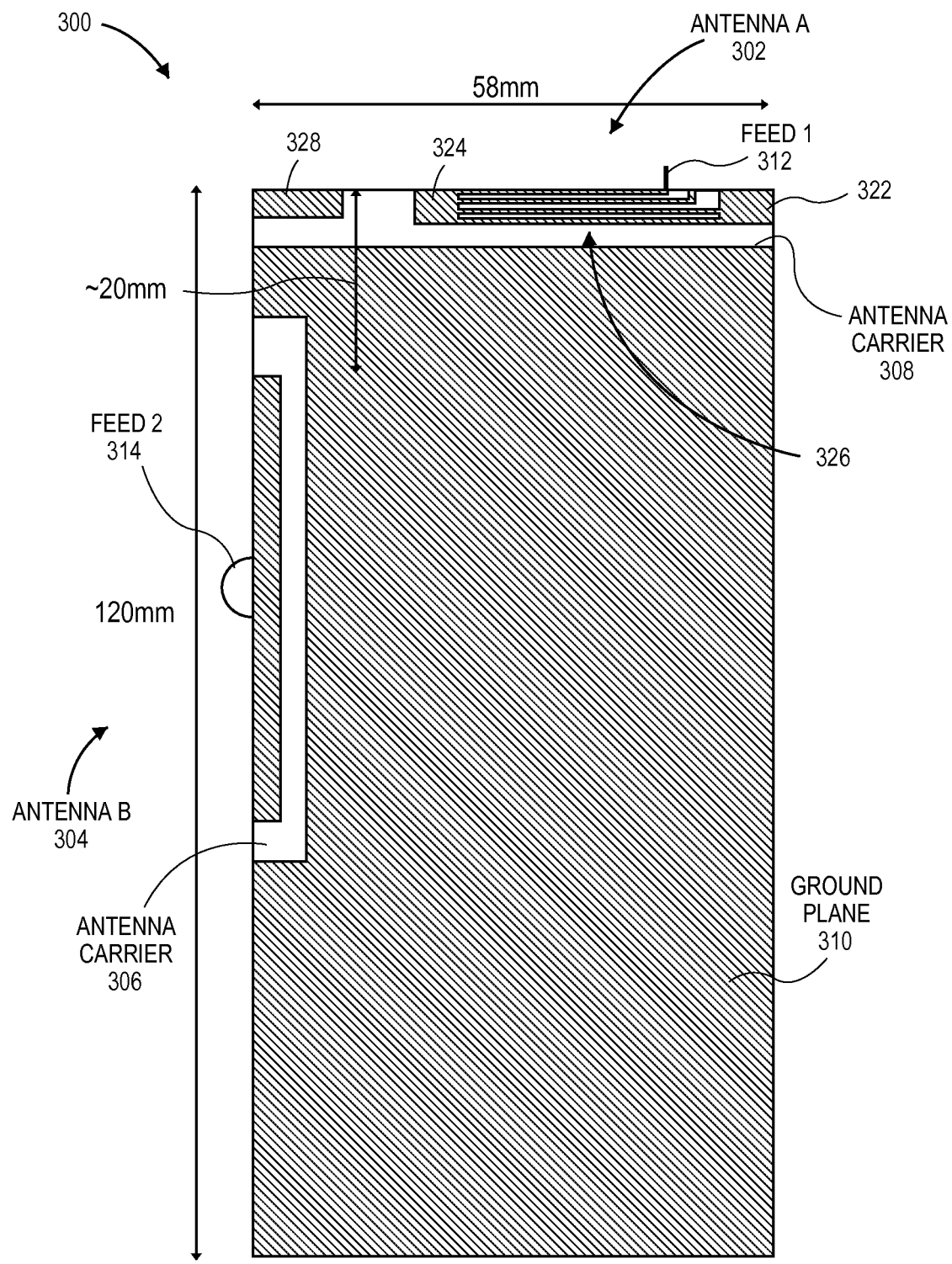
FIG. 4 illustrates a front view of the switching multi-mode antenna of FIG. 3.

FIG. 4 illustrates a front view of the switching multi-mode antenna of FIG. 3. In one embodiment, an overall height of the ground plane and switching multi-mode antenna 300 is 120 mm, and an overall width is 58 mm. The first antenna A 302 can be disposed at a top end of the ground plane 310 and the second antenna B 304 can be disposed at a side end of the ground plane 310. In the depicted embodiment, the second antenna B 304 is disposed on the left front side of the ground plane 310, but could be disposed on the right side. Similarly, the antennas can be disposed on different combination of sides of the ground plane as would be appreciated by one of ordinary skill in the art having the benefit of this disclosure. In the depicted embodiment, the second antenna B 304 is disposed approximate 20 mm from the top of the antenna carrier 308. However, as described herein, the vertical positioning of the second antenna B 304 may be varied, such as vertically up or down. Similarly, the first antenna A 302 could be shifted horizontally.

Figure 5:
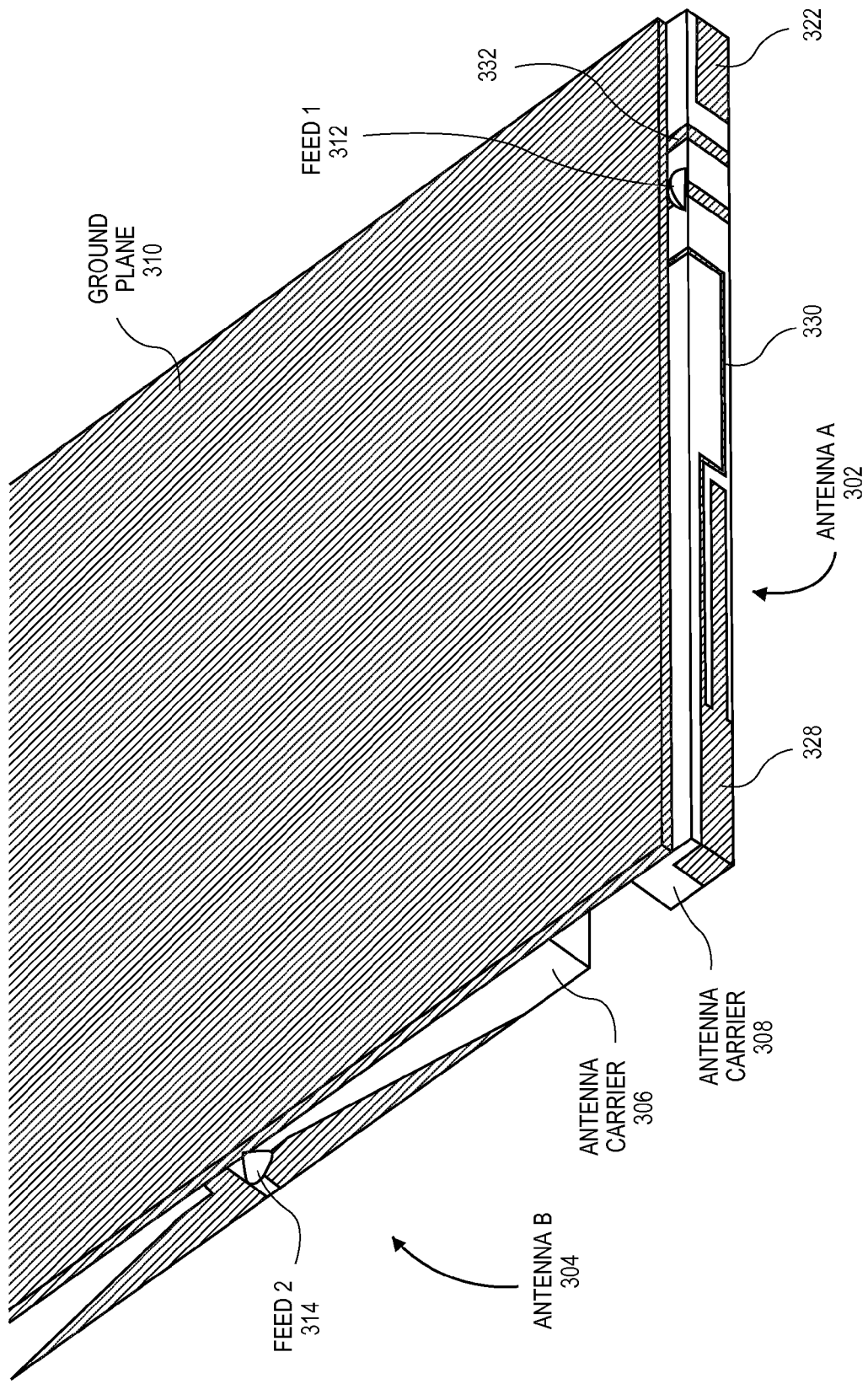
FIG. 5 illustrates a back perspective view of the switching multi-mode antenna of FIG. 3.

FIG. 5 illustrates a back perspective view of the switching multi-mode antenna 300 of FIG. 3. The back perspective view shows the coupling line 332 that couples to the ground plane 310 from the first portion 324 of the first antenna 302. The back perspective view also shows the meandering ground line 330 that couples to the ground plane 310 at the back side of the antenna carrier 308. Of course, the coupling line 332 and the meandering ground line 330 could be disposed in other configurations to couple to the ground plane 310. Also, the first portion 224 is coupled to the feed 312 via another coupling line (not labeled in FIG. 5).

Figure 6:
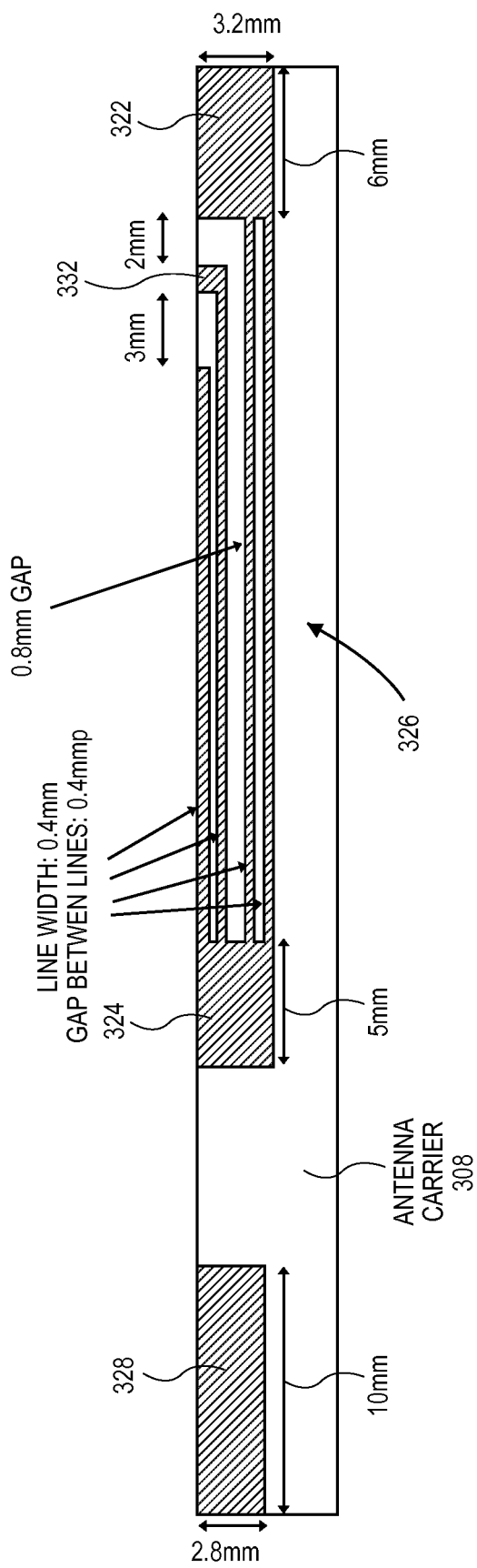
FIG. 6 illustrates a front view of the Antenna A of the switching multi-mode antenna of FIG. 3.

FIG. 6 illustrates a front view of the antenna A 302 of the switching multi-mode antenna 300 of FIG. 3. The front view shows the details of the coupling lines 326, the first portion 324, the second portion 322, and the parasitic ground element 328. In this embodiment, the coupling lines 326 have a line width of 0.4 mm, and some gaps between the lines are 0.4 mm and one gap between the lines is 0.8 mm. There may also be a gap of 2 mm between the second portion 322, and the coupling line of the first portion 324 that connects to the feed 312. There may also be a gap of 3 mm between the coupling lines of the first portion 324 that connect to the feed 312 and the ground plane 310. The second portion 324 may have a rectangular portion on the front surface of the antenna carrier 308 with a height of 3.2 mm and a width of 6 mm. The first portion 325 may have a rectangular portion on the front surface of the antenna carrier 308 with a height of 3.2 mm and a width of 5 mm. The parasitic ground element 328 may have a rectangular portion on the front surface of the antenna carrier 308 with a height of 2.8 mm and a width of 10 mm. Of course, other dimensions may be used to achieve the same frequency bands or other different frequency bands as described herein.

Figure 7:
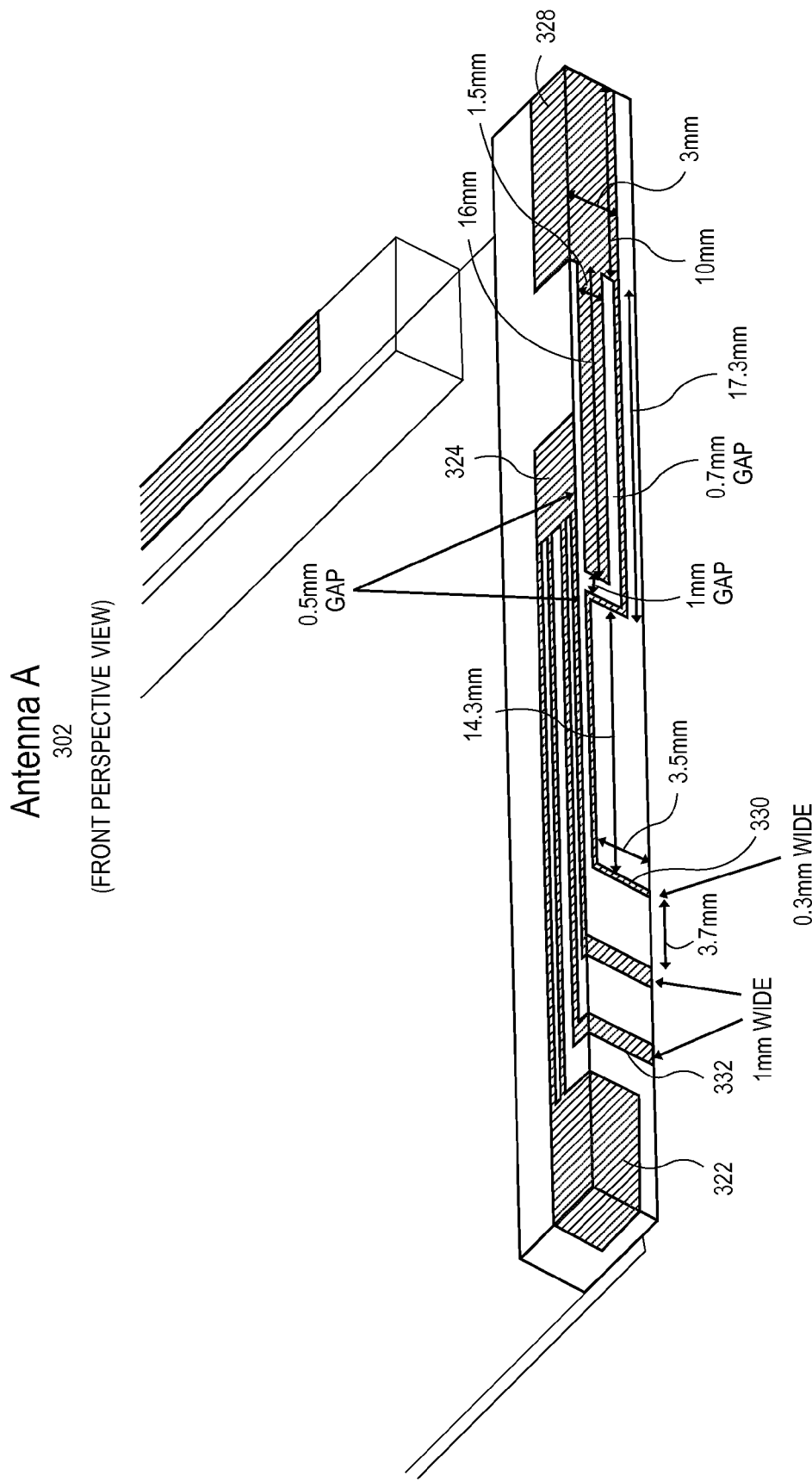
FIG. 7 illustrates a front perspective view of the Antenna A of the switching multi-mode antenna of FIG. 3.

FIG. 7 illustrates a front perspective view of the antenna A 302 of the switching multi-mode antenna 300 of FIG. 3. The front perspective view shows that the coupling line 332 has a width of 1 mm, as well as the coupling line from the first portion 324 that connects to the ground plane 310 on the back side of the antenna carrier 308. There is a gap of 3.7 mm between the coupling line that connects to the ground plane 310 and the meandering ground line 330. The meandering ground line 330 has a height of 3.55 mm on the top side of the antenna carrier 308 and then turns towards the parasitic elements and extends 14.3 mm before another bend in the meandering ground line 330. The meandering ground line then extends 17.33 mm to couple to another rectangular portion of the parasitic ground element 328 with a height of 3 mm and width of 10 mm. The parasitic ground element 330 has an arm extension that extends back towards the bend in the meandering line (back towards the feed 312) another 17.3 mm. This arm extension may have a height of 1.55 and a length of 16 mm. There is a gap at the end of the arm extension of 1 mm between the bend in the meandering line, and there is a gap of 0.7 mm between the arm extension and a parallel portion of the meandering ground line 330.

Figure 8:
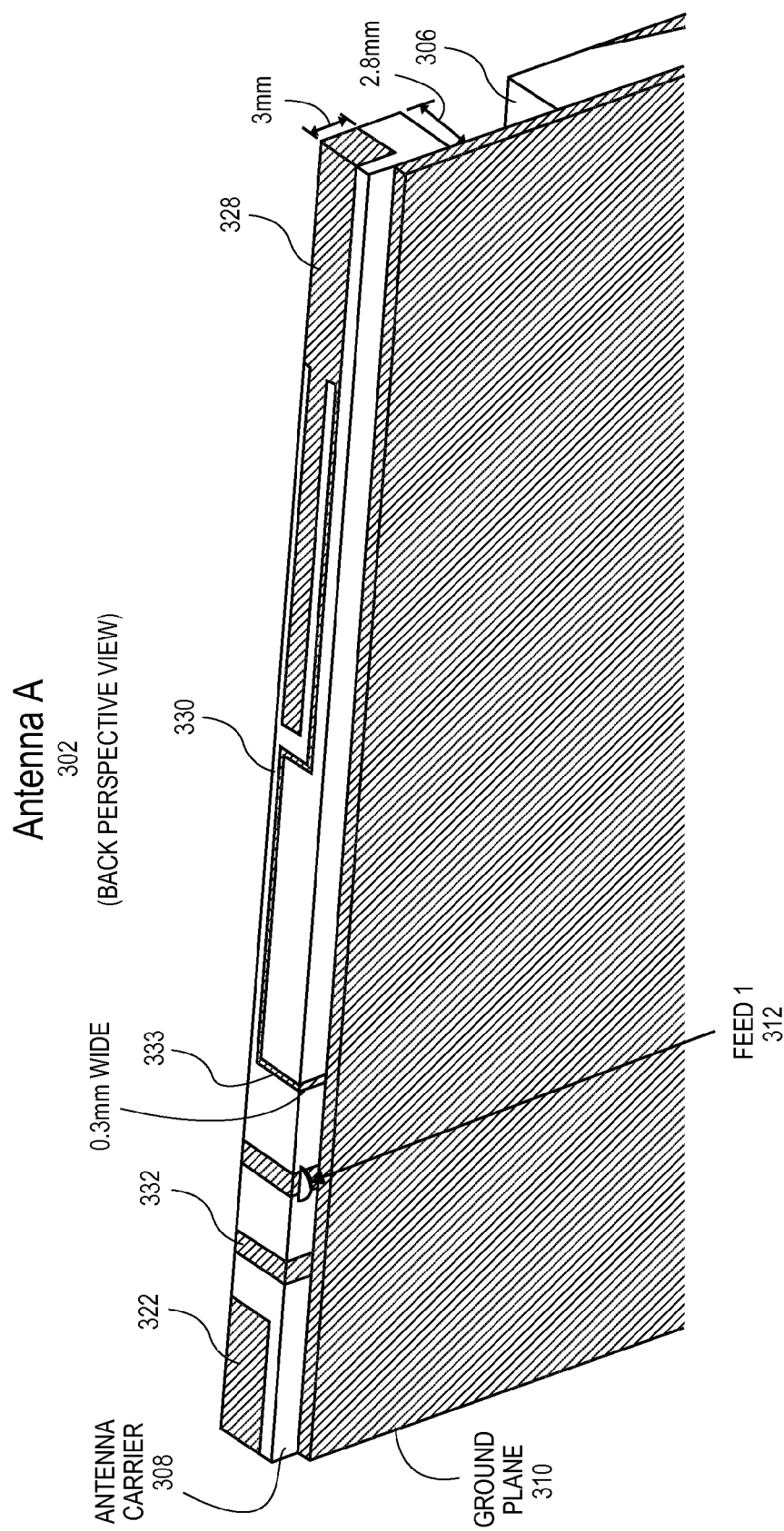
FIG. 8 illustrates a back perspective view of the Antenna A of the switching multi-mode antenna of FIG. 3.

FIG. 8 illustrates a back perspective view of the antenna A 302 of the switching multi-mode antenna 300 of FIG. 3. The back perspective view shows how the coupling line 332 couples to the ground plane 310 at the back side of the antenna carrier 308. The back perspective view also shows how the coupling line that couples the feed 312 to the first portion 324 (not illustrated in FIG. 8). The back perspective view also shows the gap between the antenna carrier 308 and the antenna carrier 306.

Figure 9:
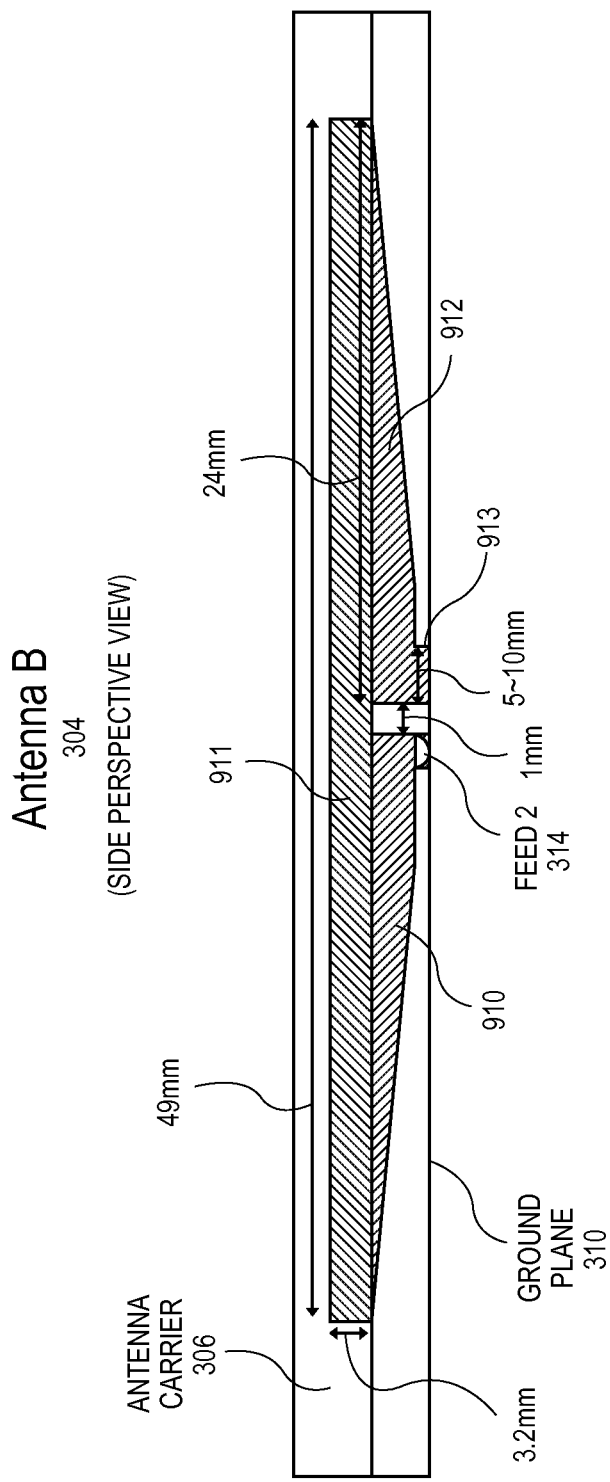
FIG. 9 illustrates a side perspective view of the Antenna B of the switching multi-mode antenna of FIG. 3.

FIG. 9 illustrates a side perspective view of the antenna B 304 of the switching multi-mode antenna 300 of FIG. 3. The second antenna B 304 includes two trapezoid shapes 910 and 912 disposed on a side surface of the antenna carrier 306, and a rectangular shape 911 disposed on a front surface of the antenna carrier 306. The feed 314 is coupled to the first of the two trapezoid shapes 910, and the second trapezoid shape 912 is coupled to the ground plane 310 via the portion 913. The two trapezoid shapes may be symmetrical or may be asymmetrical. The rectangular portion has a height of 3.2 mm and a width of 49 mm. The top sides of the trapezoid shapes have a width of 24 mm each, and have sloping edges that slope back towards the feed 312 and the portion 913. There is a gap of 1 mm between the two trapezoid shapes. This gap may vary from 1 mm to 5 mm. The portion 913 that couples the second trapezoid shape 912 to the ground plane 310 can have a width between 5 mm and 10 mm. Of course, the dimensions of the second antenna B 304 can be varied as would be appreciated by one of ordinary skill in the art having the benefit of this disclosure.

Figure 10:
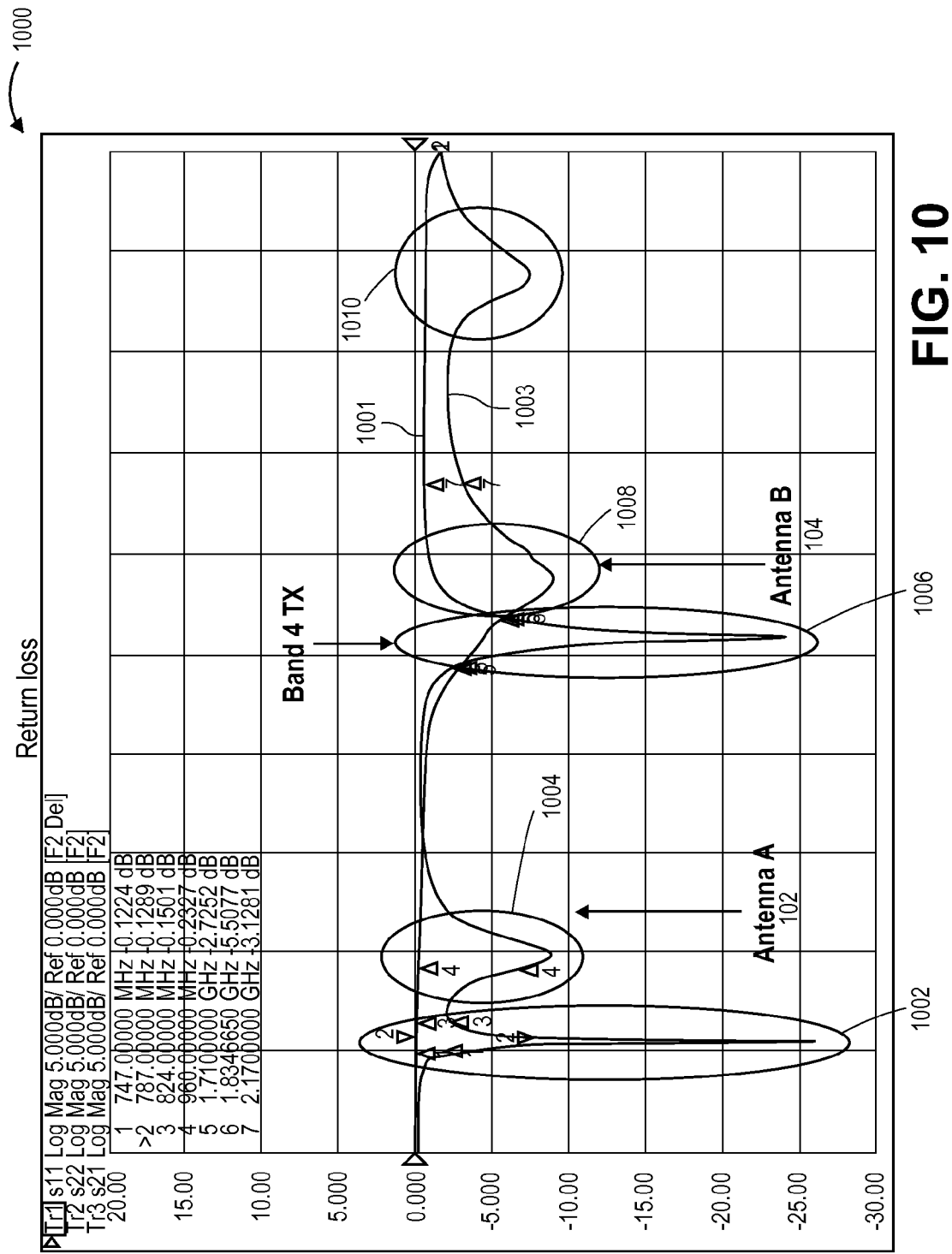
FIG. 10 is a graph of a first measured return loss of the first antenna and a second measured return loss of the second antenna of the switching multi-mode antenna of FIG. 2 according to one embodiment.

FIG. 10 is a graph 1000 of a first measured return loss 1001 of the first antenna 102 and a second measured return loss 1003 of the second antenna of the switching multi-mode antenna of FIG. 2 according to one embodiment. The graph 1000 shows the first measured return loss 1001 of the first antenna A 102 of the switching multi-mode antenna 200 of FIG. 2. The first antenna A 102 covers approximate 747 MHz to 1755 MHz. The first antenna A 102 provides a first resonant mode 1002, a second resonant mode 104, and a third resonant mode 1006. The graph 1000 also shows the second measured return loss 1003 of the second antenna B 104 of the switching multi-mode antenna 200 of FIG. 2. The second antenna B 104 covers approximate 1755 MHz to 2.26 MHz. The second antenna B 104 provides resonant modes 1008 and 1010. In one embodiment, the first resonant mode 1002 covers uplink and downlink operating bands of operating band 13, the second resonant mode 1004 covers uplink and downlink operating bands of operating bands 5 and 8, and the third resonant mode 1006 covers an uplink operating band of operating band 4 (TX only). The second antenna B 104 covers uplink and downlink operating bands of the operating bands 2 and 1, and a downlink operating band of the operating band 4 (RX only). Alternatively, other resonant modes may be achieved, and other frequency bands may be used based on the geometries of the switching multi-mode antenna 200.

As would be appreciated by one of ordinary skill in the art having the benefit of this disclosure the total efficiency of the antenna can be measured by including the loss of the structure (e.g., due to mismatch loss), dielectric loss, and radiation loss. The efficiency of the antenna can be tuned for specified target bands. For example, the target band can be Verizon LTE band and the GSM850/900 band, and the switching multi-mode antenna 200 can be tuned to optimize the efficiency for this band as well as for other bands, such as DCS, PCS, and WCDMA bands. The efficiency of the switching multi-mode antenna 200 may be done by adjusting dimensions of the 3D structure, the gaps between the elements of the structure, or a combination of both. Similarly, 2D structures can be modified in dimensions and gaps between elements to improve the efficiency in certain frequency bands as would be appreciated by one of ordinary skill in the art having the benefit of this disclosure. It should also be noted that the antennas described herein may be implemented with two-dimensional geometries, as well as three-dimensional geometries as described herein.

Figure 11:
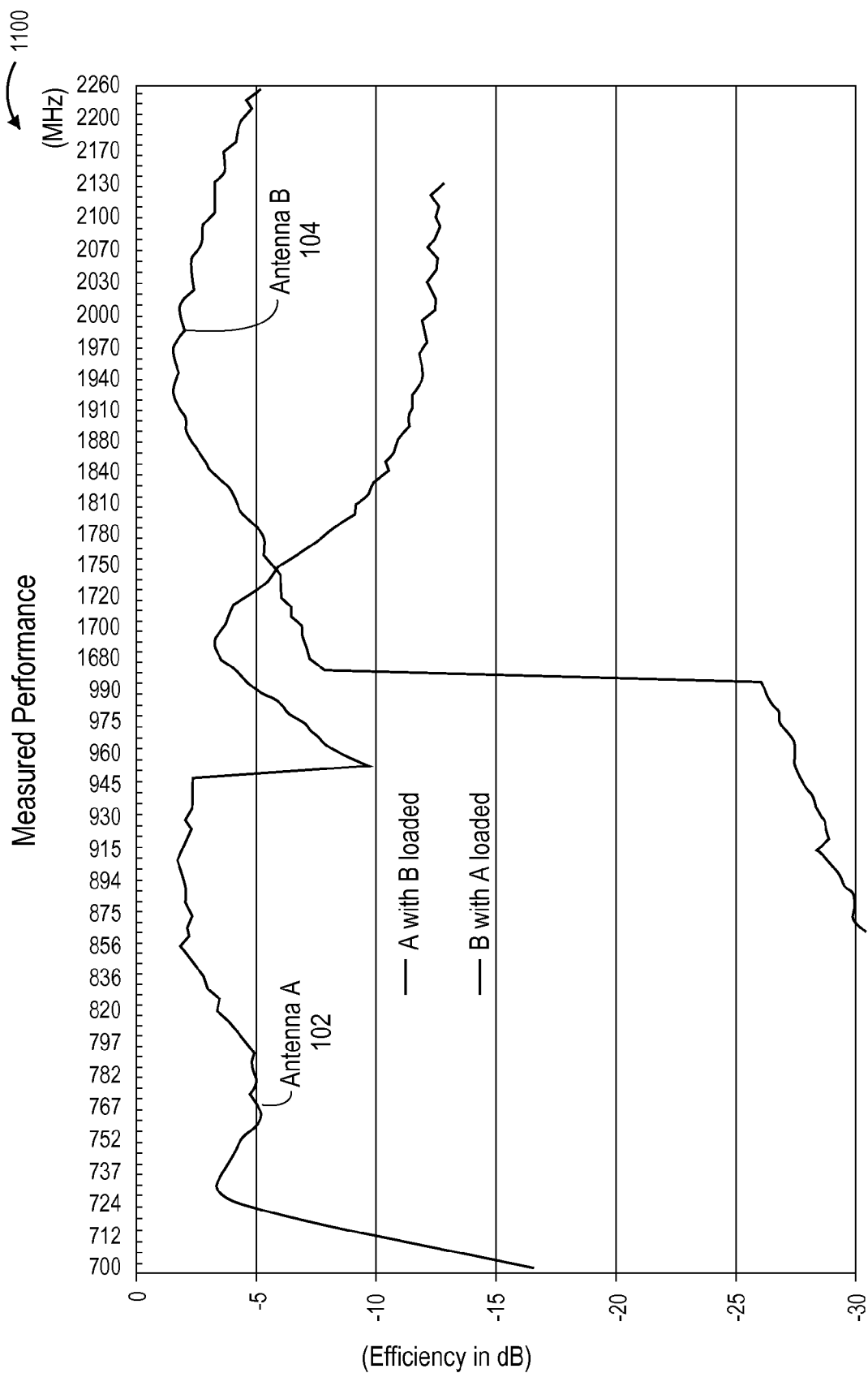
FIG. 11 is a graph of measured performance of the switching multi-mode antenna of FIG. 2 according to one embodiment.

FIG. 11 is a graph of measured performance of the switching multi-mode antenna of FIG. 2 according to one embodiment. The graph 1100 illustrates the measured performance of the first antenna A 102 and the measured performance of the second antenna B 104 of FIG. 2. This graph 1100 illustrates the measured performances of the two antennas over a frequency range of 700 MHz to 2260 MHz. It should be noted that other performances may be achieved by tuning the switching multi-mode antenna 200, such as modifying dimensions of the antenna structures and the gaps between such.

Figure 12:
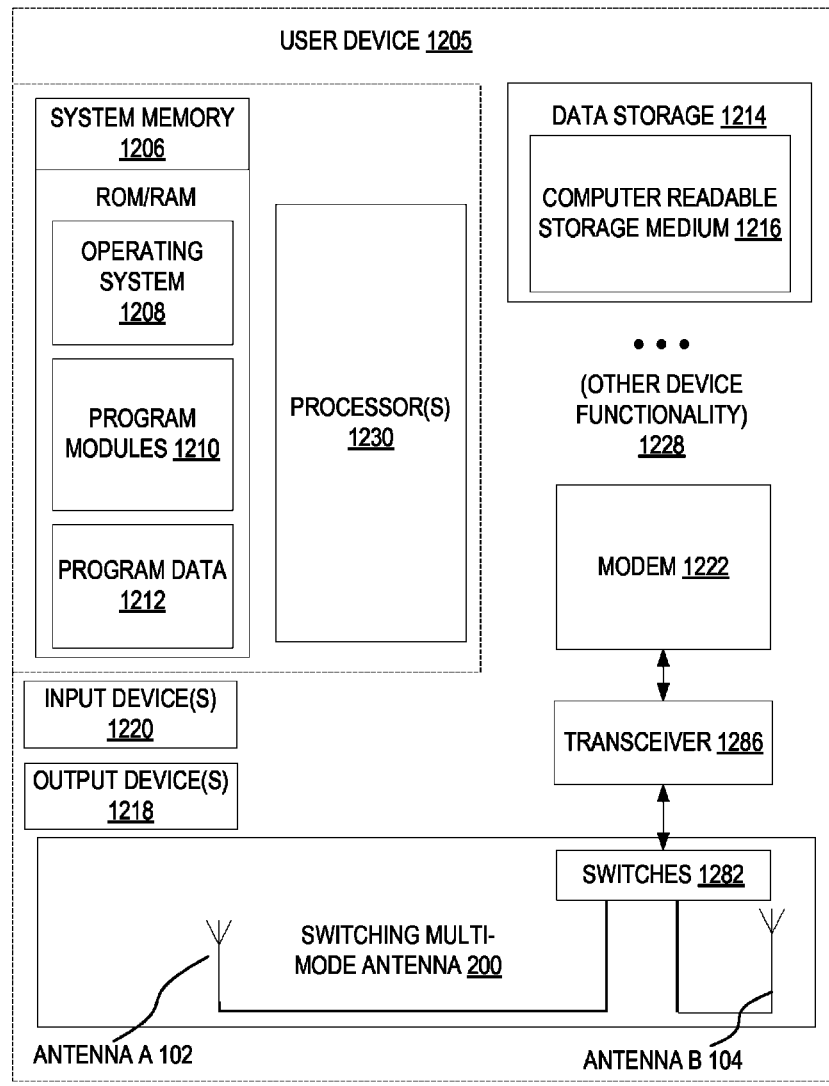
FIG. 12 is a block diagram of a user device having a switching multi-mode antenna according to one embodiment.

FIG. 12 is a block diagram of a user device 1205 having the switching multi-mode antenna 200 of FIG. 1 according to one embodiment. The user device 1205 includes one or more processors 1230, such as one or more CPUs, microcontrollers, field programmable gate arrays, or other types of processing devices. The user device 1205 also includes system memory 1206, which may correspond to any combination of volatile or non-volatile storage mechanisms. The system memory 1206 stores information which provides an operating system component 1208, various program modules 1210, program data 1212, and/or other components. The user device 1205 performs functions by using the processor(s) 1230 to execute instructions provided by the system memory 1206.

The user device 1205 also includes a data storage device 1214 that may be composed of one or more types of removable storage and/or one or more types of non-removable storage. The data storage device 1214 includes a computer-readable storage medium 1216 on which is stored one or more sets of instructions embodying any one or more of the functions of the user device 1205, as described herein. As shown, instructions may reside, completely or at least partially, within the computer readable storage medium 1216, system memory 1206 and/or within the processor(s) 1230 during execution thereof by the user device 1205, the system memory 1206 and the processor(s) 1230 also constituting computer-readable media. The user device 1205 may also include one or more input devices 1220 (keyboard, mouse device, specialized selection keys, etc.) and one or more output devices 1218 (displays, printers, audio output mechanisms, etc.).

The user device 1205 further includes a wireless modem 1222 to allow the user device 1205 to communicate via a wireless network (e.g., such as provided by a wireless communication system) with other computing devices, such as remote computers, an item providing system, and so forth. The wireless modem 1222 allows the user device 1205 to handle both voice and non-voice communications (such as communications for text messages, multimedia messages, media downloads, web browsing, etc.) with a wireless communication system. The wireless modem 1222 may provide network connectivity using any type of digital mobile network technology including, for example, cellular digital packet data (CDPD), general packet radio service (GPRS), enhanced data rates for GSM evolution (EDGE), UMTS, 1 times radio transmission technology (1xRTT), evaluation data optimized (EVDO), high-speed downlink packet access (HSDPA), WiFi, etc. In other embodiments, the wireless modem 1222 may communicate according to different communication types (e.g., WCDMA, GSM, LTE, CDMA, WiMax, etc) in different cellular networks. The cellular network architecture may include multiple cells, where each cell includes a base station configured to communicate with user devices within the cell. These cells may communicate with the user devices 1205 using the same frequency, different frequencies, same communication type (e.g., WCDMA, GSM, LTE, CDMA, WiMax, etc), or different communication types. Each of the base stations may be connected to a private, a public network, or both, such as the Internet, a local area network (LAN), a public switched telephone network (PSTN), or the like, to allow the user devices 1205 to communicate with other devices, such as other user devices, server computing systems, telephone devices, or the like. In addition to wirelessly connecting to a wireless communication system, the user device 1205 may also wirelessly connect with other user devices. For example, user device 1205 may form a wireless ad hoc (peer-to-peer) network with another user device.

The wireless modem 1222 may generate signals and send these signals to a transceiver 1286 (or one or more power amplifiers (amp) for amplification), after which they are wirelessly transmitted via the switching multi-mode antenna 200, the switching multi-mode antenna 200 comprising the switches 1282 and the first antenna 102 and the second antenna 104, as described herein. In other embodiments, one or more additional antennas that are separate from the switching multi-mode antenna 200. These antennas may be any directional, omnidirectional, or non-directional antenna in a different frequency band than the frequency bands of the switching multi-mode antenna 200. These antennas may also transmit information using different wireless communication protocols than the switching multi-mode antenna 200. In addition to sending data, the switching multi-mode antenna 200 (and any other antennas) may also receive data, which is sent to wireless modem 1222 and transferred to processor(s) 1230. It should be noted that the transmitting and receiving described herein using the proposed antennas are performed by the same wireless modem. For example, the wireless modem can transmit and receive data using the proposed antenna structure for LTE communications, and a separate wireless modem can be used to transmit and receive data for GPS communications. It should be noted that, in other embodiments, the user device 1205 may include more or less components as illustrated in the block diagram of FIG. 12.

In one embodiment, the user device 1205 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WiFi hotspot and a connection to a wireless carrier system. In one embodiment, the first wireless connection is associated with a first resonant mode of the switching multi-mode antenna 200 that operates at a first frequency band and the second wireless connection is associated with a second resonant mode of the switching multi-mode antenna 200 that operates at a second frequency band. In another embodiment, the first wireless connection is associated with the switching multi-mode antenna 200 and the second wireless connection is associated with one of the additional antennas, if any. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a single modem 1222 is shown to control transmission to both antennas 102, 104, the user device 1205 may alternatively include multiple wireless modems, each of which is configured to transmit/receive data via a different antenna and/or wireless transmission protocol. Also, in other embodiment, the switching multi-mode antenna 200 may include more than the two antennas 102, 104 as would be appreciated by one of ordinary skill in the art having the benefit of this disclosure.

The user device 1205 delivers and/or receives items, upgrades, and/or other information via the network. For example, the user device 1205 may download or receive items from an item providing system. The item providing system receives various requests, instructions, and other data from the user device 1205 via the network. The item providing system may include one or more machines (e.g., one or more server computer systems, routers, gateways, etc.) that have processing and storage capabilities to provide the above functionality. Communication between the item providing system and the user device 1205 may be enabled via any communication infrastructure. One example of such an infrastructure includes a combination of a wide area network (WAN) and wireless infrastructure, which allows a user to use the user device 1205 to purchase items and consume items without being tethered to the item providing system via hardwired links. The wireless infrastructure may be provided by one or multiple wireless communications systems, such as one or more wireless communications systems. One of the wireless communication systems may be a wireless fidelity (WiFi) hotspot connected with the network. Another of the wireless communication systems may be a wireless carrier system that can be implemented using various data processing equipment, communication towers, etc. Alternatively, or in addition, the wireless carrier system may rely on satellite technology to exchange information with the user device 1205.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 1205 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1205 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

Figure 13:
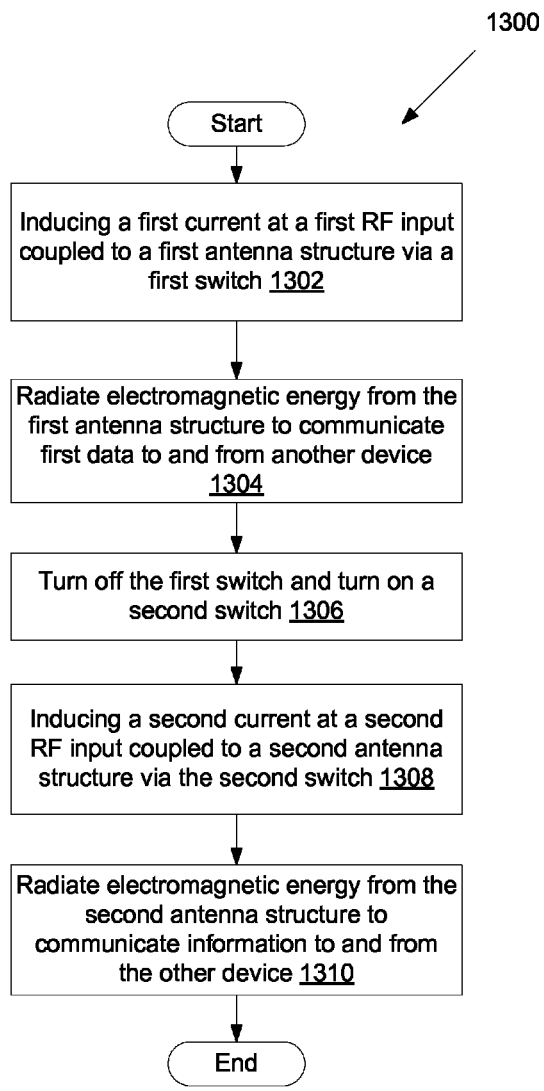
FIG. 13 is a flow diagram of a method of operating a user device having a switching multi-mode antenna according to one embodiment.

FIG. 13 is a flow diagram of a method 1300 of operating a user device having a switching multi-mode antenna according to one embodiment. In method 1300, a first current is induced at a first RF input coupled to a first antenna structure of a switching multi-mode antenna via a first switch (block 1302). In response to the first current, the first antenna structure radiates electromagnetic energy from the first antenna structure to communicate information to and from another device (block 1304). The first antenna structure is configured to communicate first data in multiple frequency bands and to transmit second data in an additional frequency band when the first switch is coupled to the first RF input. Next, the first switch is turned off and a second switch is turned on (block 1306). Next, a second current is induced at a second RF input coupled to a second antenna structure of the switching multi-mode antenna via the second switch (block 1308). In response to the second current, the second antenna structure radiates electromagnetic energy from the second antenna structure to communicate information to and from another device (block 1310). The second antenna structure may be configured to communicate information to and from the same device as the first antenna structure or a different device as would be appreciated by one of ordinary skill in the art having the benefit of this disclosure. The second antenna structure is configured to communicate third data in multiple frequency bands and to receive fourth data in the additional frequency band when the second switch is coupled to the second RF input.

In yet a further embodiment, the first antenna structure includes a first portion, a second portion, and a parasitic ground element. In this embodiment, in response to the first current, a third current is parasitically induced at the parasitic ground element that is not conductively connected to the first and second portions of the first antenna structure. In one embodiment, a current is induced at one of the RF inputs, which induces a surface current flow of the respective antenna structure. The first portion of the first antenna may parasitically induce a current flow of the parasitic ground element. By inducing current flow at the parasitic ground element, the parasitic ground element increases the bandwidth of the first antenna, providing an additional resonant mode to the resonant modes of the switching multi-mode antenna. As described herein, the parasitic ground element of the first antenna is physically separated from the first portion of the first antenna by a gap.

Figure 14:
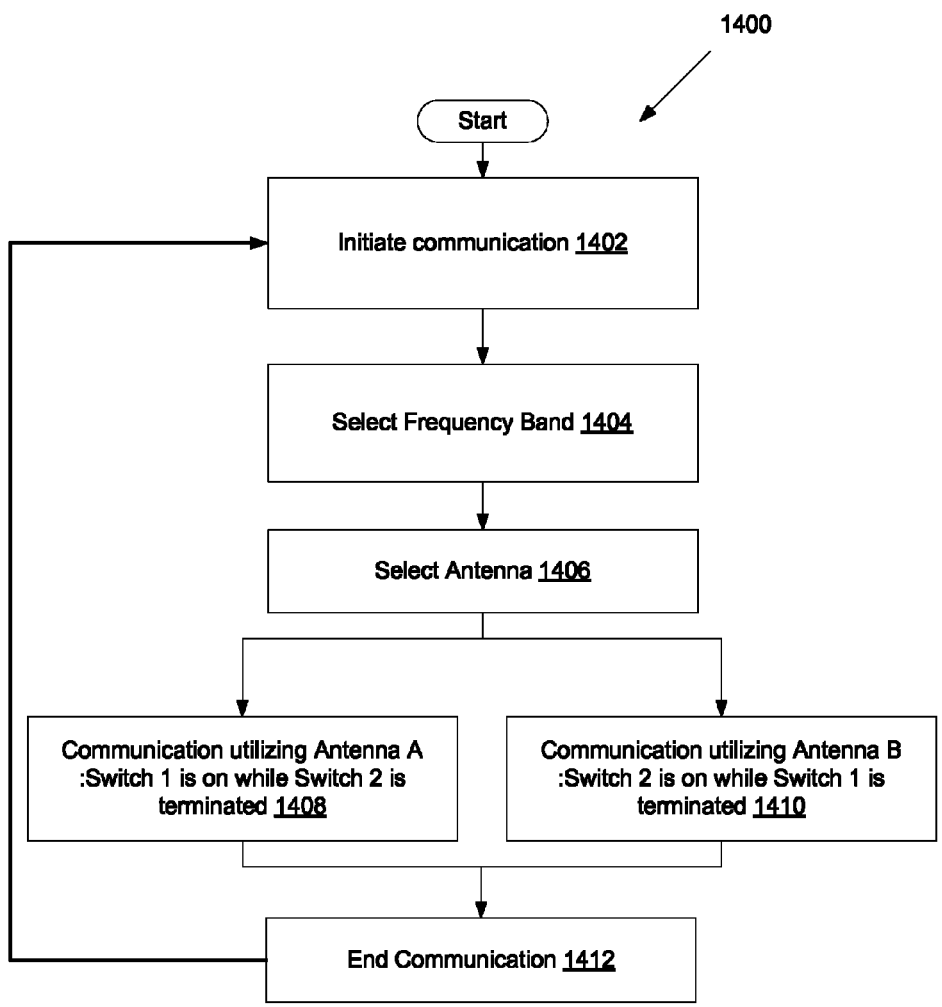
FIG. 14 is a flow diagram of an embodiment of a method of operating a user device having a switching multi-mode antenna according to another embodiment

FIG. 14 is a flow diagram of a method 1400 of operating a user device having a switching multi-mode antenna according to another embodiment. In method 1400, the user device initiates a communication (block 1402), and the user device selects a frequency band (block 1404) and an antenna (block 1406). When the user device selects a first antenna, Antenna A, the user device communicates utilizing Antenna A (block 1408). In this case, the first switch, Switch 1, is on while the second switch, Switch 2, is terminated. When the user device selects the second antenna, Antenna B, the user device communicates utilizing Antenna B (block 1410). In this case, the second switch, Switch 2, is on while the first switch, Switch 1, is terminated. The user device then ends the communication (block 1412), returning to block 1402.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. An apparatus comprising:
   a first switch configured to switch between a first radio frequency (RF) input and a first impedance termination;
   a second switch configured to switch between a second RF input and a second impedance termination;
   a first antenna disposed on an antenna carrier of a user device and coupled to the first switch, wherein the first antenna is configured to communicate first data in a first plurality of frequency bands and to transmit second data in an additional frequency band when the first switch is coupled to the first RF input; and
   a second antenna disposed on the antenna carrier of the user device and coupled to the second switch, wherein the second antenna is configured to communicate third data in a second plurality of frequency bands and to receive fourth data in the additional frequency band when the second switch is coupled to the second RF input, wherein the first antenna is configured to communicate the first data in three frequency bands of the first plurality of frequency bands and to transmit the second data in a fourth frequency band as the additional frequency band, and wherein the second antenna is configured to communicate the third data in fifth and sixth frequency bands of the second plurality of frequency bands and to receive the fourth data in the fourth frequency band, wherein the first antenna, operating in the three frequency bands, covers a range of frequencies between 824 MHz to 960 MHz and between 747 MHz to 787 MHz in a low band, wherein the first antenna, operating in the fourth frequency band, covers a first range of frequencies between 1710 MHz to 1755 MHz in a high band, and wherein the second antenna, operating in the fourth frequency band, covers a second range of frequencies between 2110 MHz to 2155 MHz in the high band.

2. The apparatus of claim 1, wherein a bandwidth of the first and second plurality of frequency bands is between 747 MHz and 2.26 GHz.

3. The apparatus of claim 1, wherein the first antenna is configured to communicate the first data in the three frequency bands of the first plurality of frequency bands and to transmit the second data in a fourth frequency band as the additional frequency band, and wherein the second antenna is configured to communicate the third data in fifth and sixth frequency bands of the second plurality of frequency bands and to receive the fourth data in the fourth frequency band.

4. The apparatus of claim 3, wherein the three frequency bands are operating band 5 between 824 MHz to 894 MHz, operating band 8 between 880 MHz to 960 MHz, operating band 13 between 746 MHz to 787 MHz, and the fourth frequency band is operating band 4 between 1710 MHz to 2155 MHz, and wherein the first antenna is configured to transmit in a first frequency range between 1710 MHz to 1755 MHz of the operating band 4 and the second antenna is configured to receive in a second frequency range between 2110 MHz to 2155 MHz of the operating band 4.

5. The apparatus of claim 4, wherein the fifth frequency band is operating band 2 between 1850 MHz to 1990 MHz, and the sixth frequency band is operating band 1 between 1920 MHz to 2170 MHz.

6. The apparatus of claim 1, wherein the second antenna, operating in the fifth frequency band, covers a range of frequencies between 1850 MHz to 1990 MHz in the high band, and wherein the second antenna, operating in the sixth frequency band, covers a range of frequencies between 1710 MHz to 2170 MHz in the high band.

7. The apparatus of claim 1, wherein the first antenna is configured to operate in uplink and downlink operating bands of the first plurality of frequency bands and in an uplink operating band of the additional frequency band, and wherein the second antenna is configured to operate in a downlink operating band of the additional frequency band.

8. The apparatus of claim 1, wherein the second antenna is further configured to operate in uplink and downlink operating bands of the second plurality of frequency bands.

9. An apparatus comprising:
   a first switch configured to switch between a first radio frequency (RF) input and a first impedance termination;
   a second switch configured to switch between a second RF input and a second impedance termination;
   a first antenna disposed on an antenna carrier of a user device and coupled to the first switch, wherein the first antenna is configured to communicate first data in a first plurality of frequency bands and to transmit second data in an additional frequency band when the first switch is coupled to the first RF input; and
   a second antenna disposed on the antenna carrier of the user device and coupled to the second switch, wherein the second antenna is configured to communicate third data in a second plurality of frequency bands and to receive fourth data in the additional frequency band when the second switch is coupled to the second RF input, wherein the first antenna comprises:
      a first portion coupled to the first switch and coupled to a ground plane via a ground line, wherein the first portion is configured to provide a first resonant mode of the first antenna;
      a second portion coupled to the first portion via one or more coupling lines, wherein the second portion is configured to provide a second resonant mode of the first antenna; and
      a parasitic ground element coupled to the ground plane, the parasitic ground element is configured to provide a third resonant mode of the first antenna and is configured to provide impedance matching to the first and second portions.

10. The apparatus of claim 9, wherein a width and a length of the first portion provide the first resonant mode centered at a first frequency, wherein a width and a length of the second portion provide the second resonant mode centered at a second frequency, and wherein a width and a length of the parasitic ground element provide the first resonant mode centered at a third frequency.

11. The apparatus of claim 10, wherein a change in the width or length of the respective portion or parasitic ground element is configured to shift the respective one of the first, second, and third frequencies.

12. The apparatus of claim 9, wherein the parasitic ground element is coupled to the ground plane via a meandering ground line, and wherein the parasitic ground element is configured to operate as a portion of a capacitor, and the meandering ground line is configured to operate as an inductor.

13. The apparatus of claim 9, wherein the parasitic ground element is configured to provide a first frequency band of the three frequency bands in a low band and increase a bandwidth of the first and second plurality of frequency bands.

14. The apparatus of claim 9, wherein the ground line is configured to extend a bandwidth in at least one of the first plurality of frequency bands.

15. The apparatus of claim 9, wherein the one or more coupling lines are configured to increase coupling between the first portion, the second portion, and the parasitic ground element.

16. The apparatus of claim 9, wherein the parasitic ground element comprises an extension arm that forms a first gap between the extension arm and the ground line and a second gap between the extension arm and the first portion.

17. An apparatus comprising:
a first switch configured to switch between a first radio frequency (RF) input and a first impedance termination;
a second switch configured to switch between a second RF input and a second impedance termination;
a first antenna disposed on an antenna carrier of a user device and coupled to the first switch, wherein the first antenna is configured to communicate first data in a first plurality of frequency bands and to transmit second data in an additional frequency band when the first switch is coupled to the first RF input; and
a second antenna disposed on the antenna carrier of the user device and coupled to the second switch, wherein the second antenna is configured to communicate third data in a second plurality of frequency bands and to receive fourth data in the additional frequency band when the second switch is coupled to the second RF input, wherein the antenna carrier comprises:
a first portion disposed at least partially above a ground plane near a top end of the ground plane, wherein the first antenna is disposed on one or more sides of the first portion of the antenna carrier; and
a second portion disposed at least partially above the ground plane near a side end of the ground plane, wherein the second antenna is disposed on one or more sides of the second portion of the antenna carrier.

18. The apparatus of claim 17, wherein the first portion and second portion are separate parts separated by a gap, and wherein the first portion is disposed orthogonally from the second portion.

19. The apparatus of claim 17, wherein the second portion comprises a second material having a higher dielectric constant than that of a first material of the first portion.

20. An apparatus comprising
a switching multi-mode antenna coupled to receive RF input from at least one of at least two radio frequency (RF) feeds via a switch, wherein the switching multi-mode antenna comprises a plurality of antenna structures to communicate first information in a plurality of frequency bands, wherein a first antenna structure of the plurality of antenna structures is configured to transmit the first information in one of the plurality of frequency bands and a second one of the plurality of antenna structures is configured to receive second information in the same one of the plurality of frequency bands, wherein the first antenna structure comprises:
a first portion coupled to the switch and coupled to a ground plane via a ground line, wherein the first portion is configured to provide a first one of a plurality of resonant modes;
a second portion coupled to the first portion via one or more coupling lines, wherein the second portion is configured to provide a second one of the plurality of resonant modes; and
a parasitic ground element coupled to the ground plane, the parasitic ground element is configured to provide a third one of the plurality of resonant modes and is configured to provide impedance matching to the first and second portions.

21. The apparatus of claim 20, further comprising the switch coupled the at least two RF feeds, wherein the switch is controllable to select one of the plurality of antenna structures to one of the at least two RF feeds and to provide an impedance termination to the other ones of the plurality of antenna structures.

22. The apparatus of claim 21, wherein the switch is a double-pole, double throw (DPDT) switch configured to switch between two antenna structures of the plurality of antenna structures.

23. The apparatus of claim 21, wherein the switch comprises two single-pole, double throw (SPDT) switches configured to switch between two antenna structures of the plurality of antenna structures.

24. The apparatus of claim 20, wherein the first antenna structure of plurality of antenna structures is a multi-mode antenna configured to provide a plurality of resonant modes of the first antenna structure of the plurality of antenna structures.

25. The apparatus of claim 24, wherein a second one of the plurality of antenna structures is a single mode antenna configured to provide a single resonant mode.

26. The apparatus of claim 24, wherein the first antenna structure is configured to operate in a first three of the plurality of frequency bands, covering a first range of frequencies between 824 MHz to 960 MHz and a second range between 747 MHz to 787 MHz in a low band, wherein the first antenna structure is configured to operate in a fourth frequency band of the plurality of frequency bands, covering a third range of frequencies between 1710 MHz to 1755 MHz in a high band, and wherein a second one of the plurality of antenna structures is configured to operate in the fourth frequency band, covering a fourth range of frequencies between 2110 MHz to 2155 MHz in the high band.

27. The apparatus of claim 26, wherein the second antenna structure is configured to operate in a fifth frequency band of the plurality of frequency bands, covering a range of frequencies between 1850 MHz to 1990 MHz in the high band, and wherein the second antenna structure is configured to operate in a sixth frequency band of the plurality of frequency bands, covering a range of frequencies between 1920 MHz to 2170 MHz in the high band.

28. The apparatus of claim 20, wherein the parasitic ground element is coupled to the ground plane via a meandering ground line, and wherein the parasitic ground element is configured to operate as a portion of a capacitor, and the meandering ground line is configured to operate as an inductor.

29. The apparatus of claim 20, wherein the one or more coupling lines are configured to increase coupling between the first portion, the second portion, and the parasitic ground element.

30. The apparatus of claim 20, wherein the parasitic ground element comprises an extension arm that forms a first gap between the extension arm and the ground line and a second gap between the extension arm and the first portion.

31. A user device, comprising:
- a wireless modem configured to provide a plurality of radio frequency (RF) feeds;
- a first switch configured to switch between a first one of the RF feeds and an impedance termination;
- a second switch configured to switch between a second one of the RF feeds and the impedance termination;
- a switching multi-mode antenna coupled to first and second switches, wherein the switching multi-mode antenna comprises a plurality of antenna structures to communicate first information in a plurality of frequency bands, wherein a first one of the plurality of antenna structures is configured to transmit the first information in one of the plurality of frequency bands and a second one of the plurality of antenna structures is configured to receive second information in the same one of the plurality of frequency bands;
- a ground plane; and
- an antenna carrier disposed at least partially above the ground plane, wherein the antenna carrier comprises a first portion upon which a first one of the plurality of antenna structures is disposed and a second portion upon which a second one of the plurality of antenna structures is disposed, wherein the first one of the plurality of antenna structures is disposed on one or more sides of the first portion of the antenna carrier, and wherein the second one of the plurality of antenna structures is disposed on one or more sides of the second portion of the antenna carrier.

32. The user device of claim 31, further comprising a transceiver coupled to the wireless modem and the first and second switches.

33. A method of operating a user device, comprising:
- inducing a first current at a first radio frequency (RF) input coupled to a first antenna structure of a switching multi-mode antenna via a first switch, wherein the first antenna structure is configured to communicate first data in a first plurality of frequency bands and to transmit second data in an additional frequency band when the first switch is coupled to the first RF input;
- radiating electromagnetic energy from the first antenna structure to communicate the first data or to transmit the second data;
- turning the first switch off and turning on a second switch;
- inducing a second current at a second RF input coupled to a second antenna structure of the switching multi-mode antenna via a second switch, wherein the second antenna structure is configured to communicate third data in a second plurality of frequency bands and to receive fourth data in the additional frequency band when the second switch is coupled to the second RF input; and
- radiating electromagnetic energy from the second antenna structure to communicate the third data or to receive the fourth data, wherein the first antenna structure comprises a first portion, a second portion, and a parasitic ground element, and wherein the method further comprises, in response to the first current, parasitically inducing a third current at the parasitic ground element that is not conductively connected to the first and second portions of the first antenna structure.

* * * * *